United States Patent Office 3,394,131
Patented July 23, 1968

3,394,131
ACID ESTERS OF PHENOTHIAZINE
Harry L. Yale, New Brunswick, and Reynold C. Merrill, Short Hills, N.J., assignors, by mesne assignments, to E. R. Squibb & Sons, Inc., New York, N.Y., a corporation of Delaware
No Drawing. Application Jan. 28, 1963, Ser. No. 254,459, now Patent No. 3,194,733, dated July 13, 1965, which is a continuation-in-part of application Ser. No. 105,548, Apr. 26, 1961. Divided and this application Jan. 19, 1965, Ser. No. 426,671
6 Claims. (Cl. 260—243)

This invention relates to new acid esters of phenothiazines having valuable therapeutic properties.

This application is a division of application, Ser. No. 254,459, filed Jan. 28, 1963, now U.S. Patent No. 3,194,733, granted July 13, 1965, which in turn is a continuation-in-part of a previous application, Ser. No. 105,548, filed Apr. 26, 1961, and now abandoned.

The therapeutically active compounds of this invention include phenothiazines of the general Formula I

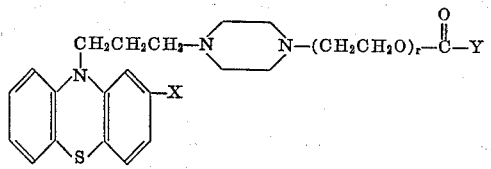

I wherein $r$ is 1 or 2; X is hydrogen, halogen (preferably chloro), trifluoromethyl, lower alkyl, lower alkoxy, lower alkanoyl, lower alkyl mercapto, trifluoromethylmercapto, and lower alkylsulfonyl (preferably methylsulfonyl); and Y is higher alkyl, higher alkenyl, higher alkynyl, aryl, ω-carboalkoxy (higher alkyl) or diphenyl(hydroxymethyl). The terms "higher alkyl," "higher alkenyl" and "higher alkynyl" as employed herein include both straight and branched chain radicals of more than four carbon atoms.

The term "ω-carboalkoxy (higher alkyl)" as employed herein, includes substituents derived from hydrocarbon carboxylic acids of more than six carbon atoms, and may be represented by the formula

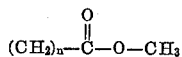

wherein $n$ is a positive integer of more than six and is preferably a positive integer of from 7 to 12. The term "aryl" is employed herein includes substituents derived from monocyclic and bicyclic aryl carboxylic acids, and may be substituted or unsubstituted and further may be represented by the formulae

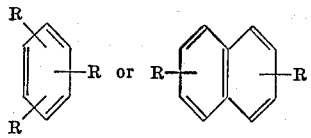

wherein each R may be hydrogen, lower alkyl, lower alkoxy or halogen (e.g. chloro or bromo) and R is preferably hydrogen, lower alkyl or lower alkoxy, and most preferably, R is hydrogen or lower alkyl. Examples of the aryl carboxylic acids which may be employed include benzoic, o-toluic, 2,6-dimethylbenzoic, 2,6-dimethylanisic, o-bromobenzoic, o-chlorobenzoic, 2,6-dichlorobenzoic, naphthoic acid, dimethylnaphthoic acid and other like acids.

The preferred compounds of this invention are those wherein X is chloro or trifluoromethyl and Y is a higher alkyl, higher alkenyl or higher alkynyl radical of from six to fourteen carbon atoms, lower alkyl- or lower alkoxy-substituted aryl or ω-carboalkoxy (higher alkyl) of less than 13 carbon atoms. Particularly preferred are those compounds wherein X is trifluoromethyl and Y is a higher alkyl radical of from nine to fourteen carbon atoms.

Since the compounds of this invention are especially adapted for parenteral administration, as more fully discussed hereinafter, they are preferably administered in the form of their free esters. The compounds, however, readily form acid-addition salts, which may be utilized in the preparation of the free esters or the purification thereof and can also be used for parenteral formulations. Acids useful for preparing the acid-addition salts include, inter alia, inorganic acids such as the hydrohalic acids (e.g. hydrochloric and hydrobromic acid), sulfuric acid, nitric acid and phosphoric acid, and organic acids such as oxalic, tartaric, citric, pamoic, fumaric, acetic, maleic and succinic acid.

The compounds of this invention are therapeutically active substances which are utilizable as tranquilizing (or ataractic) agents. These compounds differ from the corresponding lower alkanoic acid ester derivatives or the free hydroxyl derivatives in that they are significantly longer acting when administered parenterally and thus, when injected subcutaneously, for example, in a suitable vehicle, yield a long acting tranquilizing drug.

The compounds of this invention can be prepared by interacting a compound of the general Formula II

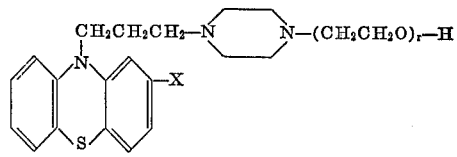

II wherein X and $r$ are as hereinbefore defined, with an acyl halide (preferably acyl chloride) of the formula: YCO-halide, wherein Y is as hereinbefore defined; the reaction preferably being conducted in an organic solvent, such as chloroform, for the reactants. Among the suitable phenothiazine reactants may be mentioned:

10-[3-(2-hydroxyethyl)piperazinopropyl]phenothiazine;
10-[3-(2-hydroxyethyl)piperazinopropyl]-2-halophenothiazines, such as
10-[3-(2-hydroxyethyl)piperazinopropyl]-2-chlorophenothiazine;
10-[3-(2-hydroxyethyl)piperazinopropyl]-2-trifluoromethylphenothiazine;
10-[3-(2-hydroxyalkoxyalkyl)piperazinopropyl]-2-halophenothiazines, such as
10-[3-(2-hydroxyethoxyethyl)piperazinopropyl]-2-trifluoromethylphenothiazine;
10[-3-(2-hydroxyethyl)piperazinopropyl]-2-(lower alkyl)-phenothiazines, such as
10[-3-(2-hydroxyethyl)piperazinopropyl]-2-methylphenothiazine;
10[-3-(2-hydroxyethyl)piperazinopropyl]-2-(lower alkoxy)phenothiazines, such as
10[-3-(2-hydroxyethyl)piperazinopropyl]-2-methoxyphenothiazine;
10-[3-(2-hydroxyethyl)piperazinopropyl]-2-(lower alkanoyl)phenothiazines, such as
10-[3-(2-hydroxyethyl)piperazinopropyl]-2-propionylphenothiazine;
10-[3-(2-hydroxyethyl)piperazinopropyl]-2-(lower alkyl mercapto)phenothiazines, such as
10[-3-(2-hydroxyethyl)piperazinopropyl]-2-methylmercaptophenothiazine;
10-[3-(2-hydroxyethyl)piperazinopropyl]-2-trifluoro methylmercaptophenothiazine and
10-[(2-hydroxyethyl)piperazinopropyl]-2-methylsulfonylphenothiazine.

Among the suitable acyl halide reactants may be mentioned the acyl chlorides of higher alkanoic acids, such as heptanoic acid, octanoic acid, 2-ethylheptanoic acid, 2,2-diethylbutyric acid, capric acid, lauric acid, tridecyclic acid, myristic acid, palmitic acid and stearic acid; the acyl chlorides of higher alkenoic acids, such as 2-heptenoic acid, 2-nonenoic acid, citronellic acid, undecylenic acid and oleic acid; the acyl chlorides of the alkynoic acids, such as heptynoic acid, octynoic acid, nonynoic acid, decynoic acid, dodecynoic acid, tridecynoic acid and octadecynoic acid; the acyl chlorides of the alkadienoic acids, such as heptadienoic acid, octadienoic acid, (alkyl)-octadienoic acid (e.g. 7-methyl-octadienoic acid), and nonadienoic acid; the acyl chlorides of the carboalkoxyalkanoic acids, such as carbomethoxyoctanoic acid, carbomethoxydecanoic acid and carbomethoxyundecanoic acid; the acyl chlorides of aryl carboxylic acids, such as benzoic acid, o-toluic acid, dimethylbenzoic acid, dimethylanisic acid, o-bromobenzoic acid, o-chlorobenzoic acid, napthoic acid, dimethylnaphthoic acid, benzilic acid and dichlorobenzoic acid; the acyl chlorides of the carboalkoxy alkenoic acids such as ω-carbomethoxyundecylenic acid, ω-carbomethoxydodecylenic acid; and the acyl chlorides of the carboalkoxyalkynoic acids, such as ω-carbomethoxyundecylynic acid, ω-carbomethoxydodecylynic acid, and other like acids.

All of the acyl halides described hereinbefore may be prepared by heating an acid of the formula Y—COOH, wherein Y is as hereinbefore defined with two parts by weight, of a thionyl halide, preferably thionyl chloride or thionyl bromide, alone, or in the presence of an anhydrous solvent, such as chloroform or benzene, under reflux for a period of about three hours, concentrating to remove the excess thionyl halide (and any solvent present), and then distilling to obtain the resultant acyl halide, Y—CO-halide, wherein Y is as hereinbefore defined.

In addition to the foregoing general procedure, to prepare compounds of Formula I, an alternate procedure may be employed. In this alternate procedure, compounds of Formula II are employed as starting materials, which starting materials are first reacted with a halogenating agent, such as thionyl chloride or thionyl bromide, to yield compounds of general Formulae III

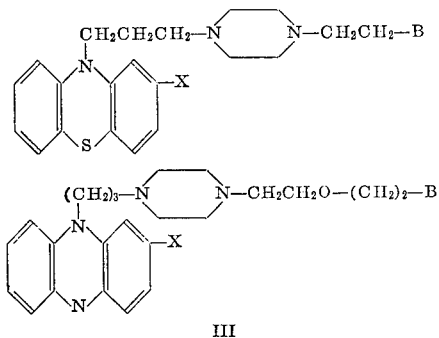

III wherein X is as hereinbefore defined and B is halogen, which are also new compounds of this invention.

The compounds of Formulae III are then reacted with a suitable alkali metal salt of the carboxylic acids of the formula

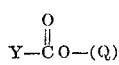

wherein Q is an alkaline metal (e.g. Na, K, etc.) and Y is as hereinbefore defined to yield respectively the new final products of Formula I.

A further alternate procedure for obtaining the compounds of this invention involves the reaction of the compound of the Formula IV

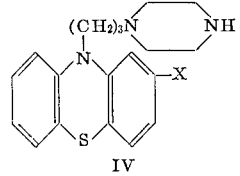

IV wherein X is as hereinbefore defined, with a haloethylacylate or a haloethoxyacylate. The haloethylacylates and haloethoxyethylacylates may be obtained by reacting haloethanol (e.g., bromoethanol or chloroethanol) or haloethoxyethanol (e.g., 2-chloroethoxyethanol or bromoethoxyethanol) with a suitable acid, such as alkanoic acid, alkenoic acid, alkynoic acid, carboalkoxyalkanoic acid, monocyclic or bicyclic aryl carboxylic aids and other like acids, to yield haloethylacylates and haloethoxyethylacylates of the formula:

wherein Y and r are as hereinbefore defined.

Another alternate suitable method of preparing the compounds of this invention involves the reaction of a compound of Formula II with a compound having the formula

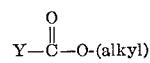

wherein Y is as hereinbefore defined, in the presence of a trace amount of sodium methoxide catalyst, to yield compounds of Formula I.

The compounds of the formula

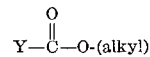

may be prepared by esterifying a suitable acid of the formula Y—COOH, wherein Y is as hereinbefore defined, with a lower alkanol, e.g., methanol or ethanol, in the presence of an acidic catalyst, e.g., sulfuric or hydrochloric acid, or with an alkylating agent, such as diazomethane or diazoethane, to yield compounds of the formula

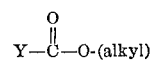

wherein Y is as hereinbefore defined.

The free bases, when initially formed, can be converted to acid-addition salts by treatment with the desired acid. This reaction is preferably conducted in an inert organic solvent under substantially anhydrous conditions by treating the base with the acid, whereby the acid-addition salt is formed.

To prepare the preferred compositions of this invention, the compounds of this invention, in the form of their free basic esters or acid addition salts, are dissolved or suspended in a parenterally acceptable liquid vehicle. For prolonged action, the compounds are formulated in an oil such as peanut oil, sesame oil, cottonseed oil, corn oil, soybean oil, synthetic glycerol esters of long chain fatty acids, and mixtures of these and other oils; the compound preferably being present in a concentration to give about 20 mg. to about 300 mg. of the compound per ml. The preferable route of administration of these formulations is subcutaneous.

The following examples illustrate the invention (all temperatures being in centigrade):

Example 1.—Acid chloride of heptanoic chloride 30 gm. of heptanoic acid and 60 gm. of thionyl chloride are mixed, kept at room temperature for one hour, refluxed for three hours, concentrated until free of thionyl chloride and the residue distilled to give the acid chloride of heptanoic acid.

Similarly, following the procedure set forth in Example 1, but substituting an equivalent amount of thionyl bromide for thionyl chloride there is obtained the acid bromide of heptanoic acid.

Example 2.—Heptanoic acid ester of 10-[3-(2-hydroxyethyl)piperazinopropyl]-2-trifluoromethylphenothiazine (a) Preparation of the heptanoic acid ester of 10-[3-(2-hydroxyethyl)piperazinopropyl] - 2 - trifluoromethylphenothiazine, dihydrochloride, hemihydrate. — To a stirred solution of 30.6 g. of 10-[3-(2-hydroxyethyl)-piperazinopropyl]-2-trifluoromethylphenothiazine in 300 ml. of dry chloroform is added, dropwise, 11.9 g. of heptanoyl chloride in 50 ml. of dry chloroform. Subsequently, the reaction mixture is stirred and heated under reflux for five hours, cooled, and shaken with 5% aqueous hydrochloric acid. The dried chloroform solution is concentrated to about 50 ml., cooled and diluted with about 450 ml. of anhydrous ether. To this cooled solution is added about 10 ml. of ethereal hydrogen chloride. The crystalline solid which separates is boiled for about five minutes with 200 ml. of benzene. The solid first dissolves and then crystallizes from the boiling mixture. The cooled mixture is filtered, and the solid recrystallized from methyl ethyl ketone to give about 19.6 g. of the product, M.P. about 184–185° (dec.).

(b) Preparation of the heptanoic acid ester of 10-[3-(2-hydroxyethyl)piperazinopropyl] - 2 - trifluoromethylphenothiazine.—An ice-cooled mixture of the dihydrochloride obtained in step (a), 500 ml. of 5% aqueous potassium carbonate solution and 1000 ml. of ether are stirred until all the solid has reacted. The ether layer is separated, dried and concentrated to give above 18.0 g. of product as a viscous pale yellow oil, $n_D^{24}$ 1.5485.

Similarly, by substituting an equivalent amount of the following acyl chlorides for the heptanoyl chloride in step (a) of Example 2, and following the procedure of steps (a) and (b), the indicated ester is obtained:

| Acyl chloride: | Ester |
|---|---|
| Octanoyl chloride | Octanoic. |
| Lauroyl chloride | Lauric. |
| Stearoyl chloride | Stearic. |
| 2-heptenoyl chloride | 2-heptenoate. |
| 2-nonenoyl chloride | 2-nonenoate. |
| Citronelloyl chloride | citronellic. |
| Undecylenoyl chloride | undecylenic. |
| Heptadienoyl chloride | Heptadienic. |
| Heptynoyl chloride | Heptynoic. |
| Dodecynoyl chloride | Dodecynoic. |
| Benzoyl chloride | Benzoic. |
| Naphthoyl chloride | Naphthoic. |
| Carbomethoxyundecylenoyl chloride | Carbomethoxyundecylenic. |
| Carbomethoxyundecanoyl chloride | Carbomethoxyundecanoic. |
| Carbomethoxyundecylynoyl chloride | Carbomethoxyundecylynic. |

Similarly, following the procedure set forth in Example 1 but substituting an equivalent amount of 10[3-(2-hydroxyethoxyethyl)piperazinopropyl) - 2 - trifluoromethylphenothiazine for 10-[3-(2 - hydroxyethyl)piperazinopropyl] - 2 - trifluoromethylphenothiazine yields the heptanoic acid ester of 10-[3-(2 - hydroxyethoxyethyl)piperazinopropyl-2-trifluoromethylphenothiazine.

Example 3.—2,2-diethylbutyric acid ester of 10-[3-(2-hydroxyethyl)piperazinopropyl] - 2 - trifluoromethylphenothiazine To 89.3 g. of 10-[3-(2-hydroxyethyl)piperazinopropyl]-2-trifluoromethylphenothiazine in one liter of dry chloroform is added, dropwise, 33.8 g. of 2,2-diethylbutyroyl chloride in 100 ml. of dry chloroform. The mixture is then refluxed for two hours and concentrated until free of chloroform. The residual oil is added to a suspension of 40 g. of sodium bicarbonate in 400 ml. of ice water and 500 ml. of ether. The mixture is shaken carefully until no further evolution of carbon dioxide occurs, the ether layer is separated, dried and concentrated to give 2,2-diethylbutyric acid ester of 10 - [3-(2-hydroxyethyl)-piperazinopropyl]-2-trifluoromethylphenothiazine, as a pale yellow oil.

Example 4.—2,2-diethylbutyric acid ester of 10-[3-(2-hydroxyethyl)piperazinopropyl] - 2 - trifluoromethylphenothiazine, salt with 2 moles of maleic acid.

11.6 g. of the product obtained in Example 2 is dissolved in 50 ml. of dry chloroform, the solution is cooled, and a saturated solution of 4.64 g. of maleic acid in dry acetone is added dropwise. The precipitated solid is filtered and recrystallized from dry acetone to give the 2,2-diethylbutyric acid ester of 10-[3-(2-hydroxyethyl)-piperazinepropyl] - 2 - trifluoromethyl phenothiazine, salt with two moles of maleic acid, having a melting point of about 167–168° C.

Example 5.—Stearic acid ester of 10-[3-(2-hydroxyethyl)-piperazinopropyl)-2-trifluoromethyl phenothiazine Following the procedure set forth in Example 3, but substituting 57.5 g. of stearoyl chloride for 2,2-diethylbutyroyl chloride yields the stearic acid ester of 10-[3-(2-hydroxyethyl)piperazinopropyl] - 2 - trifluoromethyl phenothiazine, first as a pale yellow oil which later crystallizes spontaneously to a solid, having a melting point of about 33–34° C.

Example 6. — Stearic acid ester of 10-[3-(2-hydroxyethyl)piperazinopropyl - 2 - trifluoromethyl phenothiazine, dihydrochloride 14.1 g. of the product of Example 5 are dissolved in 50 ml. of dry chloroform, the solution is cooled, and 40 ml. of a 1 molar solution of hydrogen chloride in anhydrous ether is added, dropwise, with stirring. The clear solution which forms is evaporated free of solvents and the residual oil induced to granulate. The solid is recrystallized from anhydrous acetone-ether to yield stearic acid ester of 10-[3-(2-hydroxyethyl piperazinopropyl] - 2 - trifluoromethyl phenothiazine, dihydrochloride having a melting point of about 80–81° C.

Example 7.—10-undecenoic acid ester of 10-[3-(2-hydroxyethyl)piperazinopropyl] - 2 - trifluoromethylphenothiazine Following the procedure set forth in Example 3 but substituting 41.5 g. of 10-undecenoyl chloride for 2,2-diethylbutyroyl chloride yields the 10-undecenoic acid ester of 10-[3-(2-hydroxyethyl)piperazine propyl]-2-trifluoromethylphenothiazine, as a pale yellow oil. Treatment of 12.4 g. of this material according to the procedure set forth in Example 6 yields the dihydrochloride salt of the 10-undecenoic acid ester of 10-[3-(2-hydroxyethyl) piperazinopropyl]-2-trifluoromethylphenathiazine, having a M.P. of about 153–155° C.

Example 8.—Decanoic acid ester of 10-[3-(2-hydroxyethyl)piperazinopropyl]-2-trifluoromethylphenothiazine Following the procedure set forth in Example 3, but substituting 39.3 g. of decanoyl chloride for 2,2-diethylbutyroyl chloride, there is obtained the decanoic acid ester of 10-[3 - (2 - hydroxyethyl)piperazinepropyl]-trifluoromethylphenothiazine, as a pale yellow oil. Treatment of 12.1 g. of this material according to the procedures set forth in Example 6 yields the dihydrochloride salt of 10-decanoic acid ester of 10-[3-(2-hydroxyethyl) piperazinopropyl]-2-trifluoromethylphenothiazine, having a M.P. of about 175–176° C.

Example 9.—10-[3-(2-chloroethyl)piperazinopropyl]-2-trifluoromethylphenothiazine To 21.9 g. of 10-[3-hydroxyethyl)piperazinopropyl]-2-trifluoromethylphenothiazine in 250 ml. of dry benzene is added 7.1 g. of thionyl chloride. The mixture is kept overnight, heated for 3 hours under reflux, cooled and treated with an excess of ethereal hydrogen chloride. The precipitated solid is filtered and recrystallized from absolute ethanol-anhydrous ether to give 18.4 g. of 10-[3-(2-chloroethyl)piperazinopropyl] - 2 - trifluoromethylphenothiazine as the dihydrochloride, M.P. 224–225° (dec.).

Following the procedure of Example 9, but substituting an equivalent amount of thionyl bromide for thionyl chloride, yields 10-[3-(2-bromoethyl)piperazinopropyl]-2-trifluoromethylphenothiazine.

Similarly, following the procedure of Example 9, but substituting an equivalent amount of 10-[3-(2-hydroxyethoxyethyl)piperazinopropyl] - 2 - trifluoromethylphenathiazine for 10-[3-(2-hydroxyethyl)piperazinopropyl]-2-trifluoromethylphenothiazine, yields 10 - [3 - (2 - chloroethoxyethyl)piperazinopropyl] - 2 - trifluoromethylphenothiazine.

Example 10.—2,6-dimethyl-p-anisic acid ester of 10-[3-(2-hydroxyethyl)piperazinopropyl] - 2 - trifluoromethylphenothiazine To 2.7 g. of potassium 2,6-dimethyl-p-anisoate in 25 ml. of N,N-dimethylformamide is added 4.38 g. of 10-[3-(2-chloroethyl)piperazinopropyl] - 2 - trifluoromethyl phenothiazine, the mixture is stirred and heated for 5 hours at 100°, cooled, diluted with water and the pH adjusted to 10 with 10% aqueous sodium hydroxide solution. The mixture is extracted with ether and the ether extracts are dried and concentrated to yield the 2,6-dimethyl-p-anisic acid ester of 10-[3-(2-hydroxyethyl)piperazinopropyl]-2-trifluoromethylphenothiazine. This product in 50 ml. of anhydrous ether is then reacted with 1.5 g. of maleic acid in 10 ml. of dry acetone, and the resultant precipitated product is filtered to yield the dimaleic acid salt of 2,6-dimethyl-p-anisic acid ester of 10-[3-(2-hydroxyethyl)piperazinopropyl] - 2 - trifluoromethylphenothiazine, having a M.P. of about 160–161° C.

Following the procedure set forth in Example 10, but substituting an equivalent amount of 10-[3-(2-chloroethoxyethyl)piperazinopropyl] - 2 - trifluoromethylphenothiazine for 10-[3 - (2 - chloroethyl)piperazinopropyl]-2-trifluoromethylphenothiazine, yields the 2,6-dimethyl-p-anisic acid ester of 10-[3-(2-hydroxyethoxyethyl)piperazinopropyl]-2-trifluoromethylphenothiazine.

Similarly, following the procedure set forth in Example 10, but substituting equivalent amounts of sodium heptanoate; potassium naphthoate; potassium benzilate, sodium heptynoate; potassium - 2 - heptenoate; sodium 8-carbomethoxy octanoate; potassium-2,6-dimethylbenzoate; sodium 2,6-dichlorobenzoate; potassium o-bromobenzoate; and potassium-o-chlorobenzoate for potassium 2,6-dimethyl-p-anisoate, yields respectively, the heptanoic acid; naphthoic acid; benzilic acid, heptynoic acid; heptenoic acid; 8-carbomethoxyoctanoic acid; 2,6-dimethylbenzoic acid; 2,6-dichlorobenzoic acid; o-bromobenzoic acid; and o-chlorobenzoic acid esters of 10-[3-(2-hydroxyethyl)piperazinopropyl]-2-trifluoromethylphenothiazine.

Example 11.—10-[3-(2-hydroxyethyl)piperazinopropyl]-2-trifluoromethylphenothiazine, ester with heptanoic acid A mixture of 3.93 g. of 10-[3-(1-piperazinyl)propyl]-2-trifluoromethyl)phenothiazine, 2.0 g. of 2-bromoethyl heptanoate, (β-bromoethyl heptanoate is readily prepared by the reaction of heptanoyl chloride with 2-bromoethanol), 25 ml. of anhydrous toluene, 10 mg. of copper powder, 10 mg. of potassium iodide and 1.38 g. of anhydrous potassium carbonate is stirred and refluxed under nitrogen for 20 hours. The mixture is filtered and the filtrate concentrated to dryness to give 10-[3-(2-hydroxyethyl)piperazinopropyl] - 2 - trifluoromethylphenothiazine, ester with heptanoic acid, as a viscous pale yellow oil.

Similarly, following the procedure set forth in Example 11, but substituting 2-bromoethoxyethyl heptanoate (obtained by the reaction of heptanoyl chloride with 2-bromoethoxyethanol) for 2-bromoethyl heptanoate, there is obtained 10-[3-(2-hydroxyethoxyethyl)piperazinopropyl]-2-trifluoromethylphenothiazine, ester with heptanoic acid.

Similarly, following the procedure set forth in Example 11 but substituting equivalent amounts of 2-bromoethyl heptynoate; 2-bromoethanolbenzoate; 2-bromoethyl heptenoate  2 - bromoethyl - 8 - carbomethoxyoctanoate for 2-bromoethyl heptanoate, yields respectively the heptynoic acid; benzoic acid; heptenoic acid; and 8-carbomethoxyoctanoate acid, esters of 10-[3-(2-hydroxyethyl)piperazinopropyl]-2-trifluoromethyl.

Example 12.—8-carbomethoxyoctanoic acid ester of 10-[3-(2-hydroxyethyl)piperazinopropyl] - 2 - trifluoromethylphenothiazine Following the procedure set forth in Example 3, but substituting 42 g. of 8-carbomethoxy octanoyl chloride for the 2,2-diethylbutyroyl chloride, there is obtained the 8-carbomethoxy octanoic acid ester of 10-[3-(2-hydroxyethyl)piperazinopropyl]2-trifluoromethylphenothiazine, as a pale yellow oil. Treatment of 12.4 g. of this product in accordance with the procedure set forth in Example 3 yields the dimaleic salt of 8-carbomethoxy octanoic acid ester of 10-[3-(2-hydroxyethyl)piperazinopropyl]-2-trifluoromethylphenothiazine, having a M.P. of about 157–158° C. (dec.).

Similarly, following the procedure of Example 9 but substituting equivalent amount of 10-carbomethoxydecanoyl chloride and 11-carbomethoxyundecanoyl chloride, chlorides for 8-carbomethoxyoctanoyl chloride the respective 10-carbomethoxydecanoic acid; and 11-carbomethoxyundecanoic acid esters of 10-[3-(2-hydroxyethyl)piperazinopropyl]-2-trifluoromethylphenothiazine are obtained.

Example 13.—Preparation of 11-carbomethoxyundecylenic acid (a) A mixture of 68.4 g. of dodecylenedioic acid, 500 ml. of methanol and 10 ml. of concentrated sulfuric acid is heated under reflux for six hours and then concentrated from the steam bath. The residual oil is cooled in ice, diluted with 250 g. of ice and extracted with ether. The ether extracts are washed and saturated aqueous sodium chloride solution, dried, concentrated and the residue distilled to give dimethyl dodecylenedioate.

(b) To 25.6 g. of the product from (a) in 250 ml. of methanol is added, dropwise and with stirring, a solution of 6.6 g. of 85% potassium hydroxide in 100 ml. of methanol, at room temperature. Subsequently, the mixture is stirred and refluxed for one hour and then concentrated from the steam bath. The residue is cooled, dissolved in 100 ml. of ice water and a slight excess of 10% aqueous hydrochloric acid is added. The precipitated solid is filtered to give 11-carbomethoxyundecylenic acid.

In similar fashion, but starting with dodecynedioic acid, there is obtained 11-carbomethoxyundecylynic acid.

Example 14.—10-[3-(2-hydroxyethyl)piperazinopropyl]-2-trifluoromethylphenothiazine, ester with stearic acid A mixture of 4.37 g. of 10-[3-(2-hydroxyethyl)piperazinopropyl]-2-trifluoromethylphenothiazine, 2.98 g. of methyl stearate and 10 mg. of anhydrous sodium methoxide are heated by means of an oil bath maintained at 100°. The methanol distills as it is formed and the reaction is complete in about 3 hours. The cooled mixture is dissolved in 100 ml. of ether and the ether solution is washed with three 10 ml. portions of cold water. The dried ether solution is concentrated to dryness to give 10-[3-(2-hydroxyethyl)piperazinopropyl] - 2-trifluoromethylphenothiazine, ester with stearic acid, as a pale yellow oil. When a seed crystal of the material obtained in Example 6 is added, this product also crystallizes to a solid, M.P. about 33–34° C.

Similarly, following the procedure set forth in Example 14 but substituting equivalent amounts of methyl benzoate; methyl heptynoate; methyl heptenoate and methyl heptanoate for methyl stearate, there are obtained respectively the benzoic acid; heptynoic acid; heptenoic acid and heptanoic acid esters of 10-[3-(2-hydroxyethyl)piperazinopropyl]-2-trifluoromethylphenothiazine.

Example 15.—10-[3-(2-hydroxyethyl)piperazinopropyl]-2-trifluoromethylphenothiazine, ester with benzilic acid (a) To 4.37 g. of 10-[3 - (2 - hydroxyethyl)piperazinopropyl]-2-trifluoromethylphenothiazine in 50 ml. of chloroform is added 2.65 g. of 2,2-bis-phenyl-2-chloroacetyl chloride in 25 ml. of chloroform. The mixture is refluxed for 24 hours and concentrated to give 10-[3-(2-hydroxyethyl)piperazinopropyl] - 2 - trifluoromethylphenothiazine, ester with 2,2-bis-phenyl-2-chloroacetic acid as a pale yellow oil.

(b) The product from (a) in 50 ml. of ether, 250 ml. of water and 0.84 g. of sodium bicarbonate are stirred and heated at 35° for one hour. The ether layer is separated, dried and concentrated to give 10-[3-(2-hydroxyethyl)piperazinopropyl]-2 - trifluoromethylphenothiazine, ester with benzilic acid.

Similarly, following the procedures set forth in Example 15, but substituting 10-[3-(2-hydroxyethoxyethyl) piperazinopropyl] - 2 - trifluoromethylphenothiazine for 10 - [3 - (2 - hydroxyethyl)piperazinopropyl]-2-trifluoromethylphenothiazine yields 10-[3-(2-hydroxyethoxyethyl) piperazinopropyl] - 2 - trifluoromethylphenothiazine, ester with benzilic acid.

Example 16.—Parenteral formulation A 50 g. of the heptanoic acid ester of 10-[3-(2-hydroxyethylpiperazinopropyl] - 2 - trifluoromethylphenothiazine obtained as in Example 2 is dissolved in 1000 ml. of sesame oil, U.S.P. The solution is sterile filtered and packaged aseptically for parenteral administration.

Example 17.—Parenteral formulation B

A suspension of 56 g. of micronized heptanoic acid ester of 10 - [3 - (2 - hydroxyethyl)piperazinopropyl] - 2-trifluoromethylphenothiazine, dihydrochloride, hemihydrate, prepared as in Example 2, 0.36 g. of lecithin, N.F., 0.18 g. of Tween 80 and 1.68 g. of aluminum monostearate (purified), diluted to 1000 ml. with sesame oil is prepared under sterile conditions and packaged aseptically for parenteral administration.

Example 18.—Parenteral formulation C

A solution of 50 g. of the heptanoic acid ester of 10-[3 - (2 - hydroxyethyl)piperazinopropyl] - 2 - trifluoromethylphenothiazine, 1:5 g. aluminum monostearate (purified) diluted to 1000 ml. with sesame oil, U.S.P., is sterile filtered and packaged aseptically for parenteral administration.

This invention may be variously otherwise embodied within the scope of the appended claims.

What is claimed is:
1. A compound of the formula

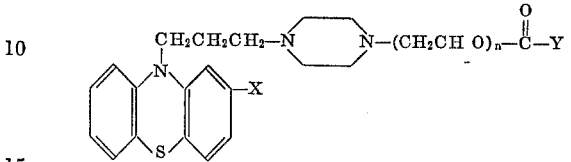

wherein X is selected from the group consisting of chloro and trifluoromethyl; n is a positive integer less than 3; and Y is selected from the group consisting of higher alkyl of six to seventeen carbon atoms, higher alkenyl of six to seventeen carbon atoms, and higher alkynyl of six to seventeen carbon atoms; and a non-toxic acid-addition salt thereof.

2. 10 - [3 - (2 - hydroxyethyl)piperazinopropyl]-2-trifluoromethylphenothiazine ester with heptanoic acid.

3. 10 - [3 - (2 - hydroxyethyl)piperazinopropyl]-2-trifluoromethylphenothiazine ester with undecenoic acid.

4. 10 - [3 - (2 - hydroxyethyl)piperazinopropyl]-2-trifluoromethylphenothiazine ester with decanoic acid.

5. 10 - [3 - (2 - hydroxyethyl)piperazinopropyl]-2-trifluoromethylphenothiazine ester with stearic acid.

6. 10 - [3 - (2 - hydroxyethyl)piperazinopropyl]-2-trifluoromethylphenothiazine ester with an alkanoic acid of ten to fifteen carbon atoms.

References Cited

UNITED STATES PATENTS

| | | | |
|---|---|---|---|
| 3,264,290 | 8/1966 | Bernstein et al. | 260—243 |
| 3,058,979 | 10/1962 | Ullyot | 260—243 |
| 2,928,767 | 3/1960 | Gulesick et al. | 260—243 |
| 2,955,115 | 10/1960 | Kummeron et al. | 260—295 |
| 2,985,654 | 5/1961 | Sherlock et al. | 260—243 |
| 3,277,708 | 1/1966 | Yale et al. | 260—243 |

FOREIGN PATENTS

| | | |
|---|---|---|
| 597,804 | 3/1961 | Belgium. |
| 851,951 | 10/1960 | Great Britain. |
| 845,943 | 8/1960 | Great Britain. |
| 553,467 | 6/1957 | Belgium. |
| 568,701 | 7/1958 | Belgium. |

HENRY R. JILES, *Primary Examiner.*

H. MOATZ, *Assistant Examiner.*